United States Patent
Ma et al.

(10) Patent No.: US 11,209,259 B1
(45) Date of Patent: Dec. 28, 2021

(54) ALL-OPTICAL ULTRASONIC DETECTION DEVICE BASED ON LIGHT-INDUCED ULTRASOUND AND LASER INTERFERENCE

(71) Applicant: Beihang University, Haidian District (CN)

(72) Inventors: Jianguo Ma, Beijing (CN); Lijun Xu, Beijing (CN); Xiangdong Ma, Beijing (CN); Bo Fu, Beijing (CN)

(73) Assignee: Beihang University

( * ) Notice: Subject to any disclaimer, the term of this patent is extended or adjusted under 35 U.S.C. 154(b) by 0 days.

(21) Appl. No.: 17/039,539

(22) Filed: Sep. 30, 2020

(51) Int. Cl.
*G01B 9/02* (2006.01)
*G01N 21/17* (2006.01)

(52) U.S. Cl.
CPC ..... *G01B 9/02002* (2013.01); *G01B 9/02027* (2013.01); *G01N 21/1702* (2013.01); *G01N 2201/06113* (2013.01); *G01N 2201/0833* (2013.01)

(58) Field of Classification Search
CPC ............ G01B 9/02002; G01B 9/02007; G01B 9/02027; G01N 21/1702; G01N 2201/06113; G01N 2201/0833; G01N 29/2418
See application file for complete search history.

(56) References Cited

U.S. PATENT DOCUMENTS

| | | | | |
|---|---|---|---|---|
| 2002/0167676 | A1* | 11/2002 | Blouin | G01S 17/58 356/502 |
| 2009/0168074 | A1* | 7/2009 | Monchalin | G01N 29/2418 356/502 |
| 2012/0281227 | A1* | 11/2012 | Montgomery | G01B 9/02068 356/477 |
| 2016/0363562 | A1* | 12/2016 | Takahashi | G01N 29/46 |
| 2019/0293608 | A1* | 9/2019 | Ihn | G01N 29/069 |

FOREIGN PATENT DOCUMENTS

CN 109781625 A * 5/2019

* cited by examiner

*Primary Examiner* — Michael A Lyons
(74) *Attorney, Agent, or Firm* — Barclay Damon LLP

(57) ABSTRACT

An all-optical ultrasonic detection device based on light-induced ultrasound and laser interference. In the device, a first laser is connected to an optical switch, the optical switch is connected to a dielectric film and a second laser generates a reference laser beam and a plurality of detection laser beams. The reference laser beam generates a first frequency-shifted reference laser beam and a plurality of second frequency-shifted reference laser beams. The first frequency-shifted reference laser beam generates a carrier signal. The detection laser beams are reflected by the dielectric film and then interfere with the second frequency-shifted reference laser beams. The interference light passes through a fourth fiber coupler and reaches a second photodiode to generate a frequency-modulated signal. The frequency-modulated signal and the carrier signal are input to a frequency mixer to generate a mixed signal. An acquisition unit is configured to obtain a vibration signal for the to-be-detected object.

9 Claims, 1 Drawing Sheet

ALL-OPTICAL ULTRASONIC DETECTION DEVICE BASED ON LIGHT-INDUCED ULTRASOUND AND LASER INTERFERENCE

CROSS REFERENCE TO RELATED INVENTION

This application is based upon and claims priority to, under relevant sections of 35 U.S.C. § 119, Chinese Patent Application No.: 202010787228.5, filed Aug. 7, 2020, the entire contents of which are hereby incorporated by reference.

TECHNICAL FIELD

The present invention relates to the field of ultrasonic detection, and in particular, to an all-optical ultrasonic detection device based on light-induced ultrasound and laser interference.

BACKGROUND

Ultrasonic detection is widely used in many fields such as nondestructive inspection (NDI), biomedical imaging and ocean surveillance, and is one of the most important detection technologies at present. The core of ultrasonic detection is an ultrasonic sensor. Traditional ultrasonic sensors are mostly made of piezoelectric materials, which cannot achieve high sensitivity and wide bandwidth at the same time, and have greatly-limited application due to the strong electromagnetic interference (EMI).

Ultrasonic sensing based on laser interference has excellent anti-EMI capability, and can still guarantee high sensitivity under a wide bandwidth, which is a very promising ultrasonic detection solution. So far, the existing optical ultrasonic detection system only generates ultrasound based on the principle of light-induced ultrasound or achieves ultrasound detection based on laser interference, which cannot achieve all-optical ultrasonic detection. In addition, it is difficult for the ultrasonic detection system based on an optical fiber ultrasonic sensor to realize the array integration of multiple sensors, which greatly limits its further generalization and application.

SUMMARY

The present invention is intended to provide an all-optical ultrasonic detection device based on light-induced ultrasound and laser interference to improve the sensitivity and bandwidth of ultrasonic detection.

To achieve the above purpose, the present invention provides the following technical solutions.

An all-optical ultrasonic detection device based on light-induced ultrasound and laser interference includes: a first laser, an optical switch, a dielectric film, a light-absorbing film, a second laser, a first fiber coupler, a plurality of fiber loopbacks, an acousto-optic frequency shifter (AOFS), a second fiber coupler, a third fiber coupler, a plurality of fourth fiber couplers, a first photodiode, a plurality of second photodiodes, a plurality of frequency mixers, and an acquisition unit;

where an output end of the first laser is connected to the optical switch via an optical fiber; a plurality of output ends of the optical switch are separately connected to the dielectric film via a plurality of optical fibers; the light-absorbing film is fixed to an emitting light path of the dielectric film; and the light-absorbing film is configured to absorb short laser pulses emitted by the first laser to generate light-induced ultrasound;

the first fiber coupler is located on the emitting light path of the second laser, and the continuous laser beam emitted by the second laser passes through the first fiber coupler and is divided into an initial reference laser beam and a plurality of detection laser beams; the AOFS is located on the light path of the initial reference laser beam; the initial reference laser beam passes through the AOFS and the second fiber coupler in sequence to generate a plurality of frequency-shifted reference laser beams, and the plurality of frequency-shifted reference laser beams include a first frequency-shifted reference laser beam and a plurality of second frequency-shifted reference laser beams; the third fiber coupler is located on the emitting light path of the first frequency-shifted reference laser beam; the first photodiode is located on the emitting light path of the third fiber coupler; and the first photodiode is configured to output a plurality of carrier signals;

the plurality of second frequency-shifted reference laser beams, the plurality of detection laser beams, the plurality of fiber loopbacks, the plurality of fourth fiber couplers, the plurality of second photodiodes, the plurality of carrier signals and the plurality of frequency mixers are in one-to-one correspondence;

the plurality of fiber loopbacks are located on the light paths of the plurality of detection laser beams, respectively; each detection laser beam passes through the corresponding fiber loopback and reaches the dielectric film that is configured to reflect the detection laser beam; each detection laser beam interferes with the corresponding second frequency-shifted reference laser beam after being reflected to produce interference light; the interference light passes through the corresponding fourth fiber coupler and reaches the corresponding second photodiode to produce a frequency-modulated signal; the frequency-modulated signal and the corresponding carrier signal are input to the corresponding frequency mixer to produce a mixed signal; and the acquisition unit is configured to acquire the mixed signals output by the plurality of frequency mixers separately to obtain a vibration signal for the to-be-detected object.

Optionally, the short laser pulses emitted by the first laser are irradiated to the dielectric film by gating to the optical fiber corresponding to a branch via the optical switch, then pass through the dielectric film, and are irradiated to the light-absorbing film; and the light-absorbing film generates light-induced ultrasound to detect the to-be-detected object.

Optionally, the dielectric film is formed by alternately stacking a plurality of dielectric film layers, and has selective transparency for light of different wavelengths; and the dielectric film is configured to transmit short laser pulses emitted by the first laser, and reflect the continuous laser beam emitted by the second laser.

Optionally, the ultrasonic pulse has a width of 1 ns to 30 ns.

Optionally, the ultrasonic pulse has a frequency band range of 0.5 MHz to 60 MHz.

Optionally, the first frequency-shifted reference laser beam and the initial reference laser beam are both incident on the third fiber coupler, and the light emitted by the third fiber coupler is a laser beam with carrier information.

Optionally, the device further includes a first amplifier and a plurality of second amplifiers;

an input end of the first amplifier is electrically connected to an output end of the first photodiode; an output end of the first amplifier is electrically connected to first input ends of the plurality of frequency mixers; and the output end of the first amplifier outputs a plurality of amplified signals that enter a corresponding frequency mixer via a corresponding first input end;

input ends of the plurality of second amplifiers are electrically connected to respective output ends of the second photodiodes;

and output ends of the plurality of second amplifiers are electrically connected to respective second input ends of the plurality of frequency mixers; and a plurality of amplified signals output by the first amplifier, the plurality of second amplifiers and the plurality of frequency mixers are in one-to-one correspondence.

Optionally, the short laser pulse produced by the first laser has a wavelength of 532 nm.

Optionally, the continuous laser beam produced by the second laser has a wavelength of 1,310 nm.

According to specific examples of the present invention, the present invention has the following technical effects.

The present invention can generate ultrasonic pulses for detecting a to-be-detected object through a dielectric film and a laser film, and compared with the prior art where vibration information caused by sound waves is acquired through piezoelectric materials, the present invention has shorter pulse time. Moreover, compared with the solution in the prior art that can only achieve ultrasound detection, the present invention generates light-induced ultrasound through the related light path of a first laser, and uses the related light path of a second laser to achieve ultrasound detection, thereby integrating the ultrasound generation and the ultrasound reception into a whole. The detection position can be adjusted directly by gating to the corresponding fiber branch via an optical switch, which improves the integration level and flexibility of ultrasonic detection.

BRIEF DESCRIPTION OF DRAWINGS

To describe the technical solutions in the examples of the present invention or in the prior art more clearly, the following briefly introduces the accompanying drawings required for describing the examples. Apparently, the accompanying drawings in the following description show merely some examples of the present invention, and a person of ordinary skill in the art may still derive other drawings from these accompanying drawings without creative efforts.

In the figures: 1 represents a first laser, 2 represents an optical switch, 3 represents a dielectric film, 4 represents a light-absorbing film, 5 represents a second laser, 6 represents a fiber loopback, 7 represents an acousto-optic frequency shifter (AOFS), 8 represents a second fiber coupler, 9 represents a third fiber coupler, 10 represents a fourth fiber coupler, 11 represents a first photodiode, 12 represents a second photodiode, 13 represents an acquisition unit, 14 represents a first fiber coupler, 15 represents a first amplifier, 16 represents a second amplifier, and 17 represents a frequency mixer.

DETAILED DESCRIPTION

The technical solutions in the examples of the present invention are clearly and completely described below with reference to the accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

To make the foregoing objectives, features, and advantages of the present invention more comprehensible, the present invention is further described in detail below with reference to the accompanying drawings and specific implementations.

Figure 1:
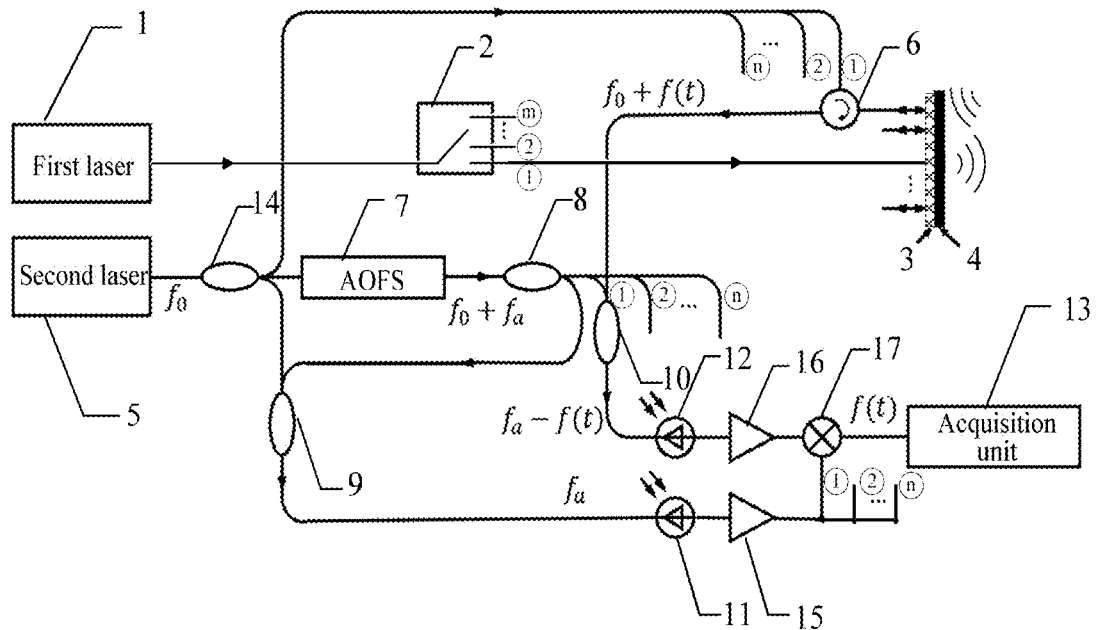
FIG. 1 is a structure diagram for the all-optical ultrasonic detection device based on light-induced ultrasound and laser interference of the present invention.

FIG. 1 is a structure diagram for the all-optical ultrasonic detection device based on light-induced ultrasound and laser interference of the present invention. As shown in FIG. 1, the all-optical ultrasonic detection device based on light-induced ultrasound and laser interference of the present invention includes: a first laser 1, an optical switch 2, a dielectric film 3, a light-absorbing film 4, a second laser 5, a first fiber coupler 14, a plurality of fiber loopbacks 6, an AOFS 7, a second fiber coupler 8, a third fiber coupler 9, a plurality of fourth fiber couplers 10, a first photodiode 11, a plurality of second photodiodes 12, a plurality of frequency mixers 17, and an acquisition unit 13.

An output end of the first laser 1 is connected to the optical switch 2 via an optical fiber; and a plurality of output ends of the optical switch 2 are separately connected to the dielectric film 3 via a plurality of optical fibers. The optical switch 2 in the figure includes m output ends, which are connected to m optical fibers, respectively. The light-absorbing film 4 is fixed to an emitting light path of the dielectric film 3; and the dielectric film 3 is configured to absorb short laser pulses emitted by the first laser 1. This part constitutes a light-induced ultrasound excitation light path. Specifically, the first pulse laser emits short laser pulses, which are gated to a certain optical fiber via the optical switch 2, and penetrates the dielectric film 3 to irradiate a specific part of the light-absorbing film 4, and the light-absorbing film 4 produces light-induced ultrasonic pulses for the ultrasonic detection of a to-be-detected object. The dielectric film 3 of the present invention is formed by alternately stacking a plurality of dielectric film layers, and has selective transparency for light. The dielectric film has high transmittance for short laser pulses emitted by the first laser 1, nearly transparent, and is opaque for the continuous laser beam emitted by the second laser, with a reflectivity higher than 99%.

In the field of ultrasonic detection, a to-be-detected object is usually a biological tissue or an industrial device. Through switching to different laser excitation positions via the optical switch 2, the spatial scanning can be achieved for a short pulse sound source.

The first fiber coupler 14 is located on the emitting light path of the second laser 5, and the continuous laser beam emitted by the second laser 5 passes through the first fiber coupler 14 and is divided into an initial reference laser beam and a plurality of detection laser beams. In the figure, there are n detection laser beams. The AOFS 7 is located on the light path of the initial reference laser beam. The AOFS 7 is configured to perform frequency shift for the initial reference laser beam. The second fiber coupler 8 is a 1×N fiber coupler. The initial reference laser beam passes through the AOFS 7 and the second fiber coupler 8 in sequence to generate a plurality of frequency-shifted reference laser beams, and the plurality of frequency-shifted reference laser beams include a first frequency-shifted reference laser beam and a plurality of second frequency-shifted reference laser beams. In the figure, there are n second frequency-shifted reference laser beams. The third fiber coupler 9 is a 2×1 fiber coupler. The third fiber coupler 9 is located on the emitting light path of the first frequency-shifted reference laser beam, which has input of the initial reference laser beam and the first frequency-shifted reference laser beam. The first photodiode 11 is located on the emitting light path of the third fiber coupler 9. The light emitted by the third fiber coupler 9 is a laser beam with carrier information. The light emitted by the third fiber coupler 9 reaches the first photodiode 11 to generate a plurality of carrier signals. The plurality of fiber loopbacks 6 are located on the light paths of the plurality of detection laser beams, respectively; each detection laser beam passes through the corresponding fiber loopback 6 and reaches the dielectric film 3 that is configured to reflect the detection laser beam; each detection laser beam interferes with the corresponding second frequency-shifted reference laser beam after being reflected to produce interference light; the interference light passes through the corresponding fourth fiber coupler 10 and reaches the corresponding second photodiode 12 to produce a frequency-modulated signal; the frequency-modulated signal and the corresponding carrier signal are input to the corresponding frequency mixer 17 to produce a mixed signal. The fourth fiber coupler 10 is a 2×1 fiber coupler. The acquisition unit 13 is configured to acquire the mixed signals output by the plurality of frequency mixers 17 separately to obtain a vibration signal for the to-be-detected object. This part is the process of acquiring ultrasonic signals by laser interference.

Specifically, the laser beam emitted by the second laser 5 is divided into a plurality of beams, where, one beam is adopted as an initial reference laser beam ($f_0$), one beam enters the AOFS 7 to give frequency-shifted reference laser beams ($f_0+f_a$), and the remaining n beams are adopted as detection laser beams. The laser generated by the first laser 1, after reaching the light-absorbing film 4, is absorbed by the light-absorbing film 4 to generate light-induced ultrasound. The light-induced ultrasound, when hitting a to-be-detected object, is reflected by the to-be-detected object and then received by the dielectric film 3, causing the vibration of the dielectric film 3. Due to the Doppler effect, after the detection light passes through the fiber loopback 6 and reaches the dielectric film 3, and reflected detection light is produced, the frequency of the reflected detection light ($f_0+f^{(t)}$) changes with the vibration of the dielectric film 3, so the vibration information is modulated into the change of light frequency. The detection light, after reflected by the dielectric film 3, interferes with the frequency-shifted reference light to cause a change in light intensity ($f_a-f^{(t)}$). The second photodiode 12 detects a frequency-modulated signal including vibration information. The frequency mixer 17 mixes the frequency-modulated signal and the carrier signal ($f_a$) that is, demodulates the output signal $f^{(t)}$, which is proportional to the vibration signal generated by the to-be-detected object. The demodulated output signal $f^{(t)}$ is acquired by the acquisition unit 13 to obtain the vibration signal for the to-be-detected object.

As shown in the figure, the plurality of second frequency-shifted reference laser beams, the plurality of detection laser beams, the plurality of fiber loopbacks 6, the plurality of fourth fiber couplers 10, the plurality of second photodiodes 12, the plurality of carrier signals and the plurality of frequency mixers 17 are in one-to-one correspondence. Specifically, a detection laser beam passes through the fiber loopback 6 and reaches the dielectric film 3; the detection laser beam reflected by the dielectric film 3 interferes with a second frequency-shifted reference laser beam to generate interference light; an interference light beam passes through a fourth fiber coupler 10 and reaches a second photodiode 12 to generate a frequency-modulated signal; and a frequency-modulated signal and a carrier signal are mixed in a frequency mixer 17 to regain the signal for each path.

As a specific example, the short laser pulse generated by the first laser 1 of the present invention has a wavelength of 532 nm, and the laser beam generated by the second laser 5 has a wavelength of 1,310 nm. The dielectric film 3 is completely transmissive for short laser pulses generated by the first laser 1, and reflects the laser beam generated by the second laser 5. In this case, after the short laser pulse generated by the first laser 1 reaches the light-absorbing film 4, the generated ultrasonic pulse has a width of 1 ns to 30 ns, and a frequency band range of 0.5 MHz to 60 MHz.

As a specific example, in the present invention, both the first frequency-shifted reference laser beam and the initial reference laser beam are incident on the third fiber coupler 9. The light emitted by the third fiber coupler 9 is a laser beam with carrier information. The light emitted by the third fiber coupler 9 reaches the first photodiode 11 to generate a plurality of carrier signals.

As a specific example, the all-optical ultrasonic detection device based on light-induced ultrasound and laser interference of the present invention further includes a first amplifier 15 and a plurality of second amplifiers 16. An input end of the first amplifier 15 is electrically connected to an output end of the first photodiode 11, and in this case, the first photodiode 11 generates a carrier signal, which is amplified by the first amplifier 15 to generate a plurality of amplified signals. A plurality of output ends of the first amplifier 15 are electrically connected to first input ends of the plurality of frequency mixers 17, and each amplified signal is input to one frequency mixer 17 via a first input end of the frequency mixer. Input ends of the plurality of second amplifiers 16 are electrically connected to respective output ends of the second photodiodes 12, output ends of the plurality of second amplifiers 16 are electrically connected to second input ends of the plurality of frequency mixers 17, and the amplified signal output by each second amplifier 16 is input to a frequency mixer 17 via the corresponding second input end of the frequency mixer 17. The first photodiode 11 and the second photodiodes 12 convert their respective optical signals into electrical signals, which are then amplified by the corresponding first amplifier 15 and the second amplifiers 16. The amplified frequency-modulated electrical signal and the amplified carrier electrical signal are first processed by the frequency mixer 17, and then acquired by the acquisition unit 13.

Figure 2:
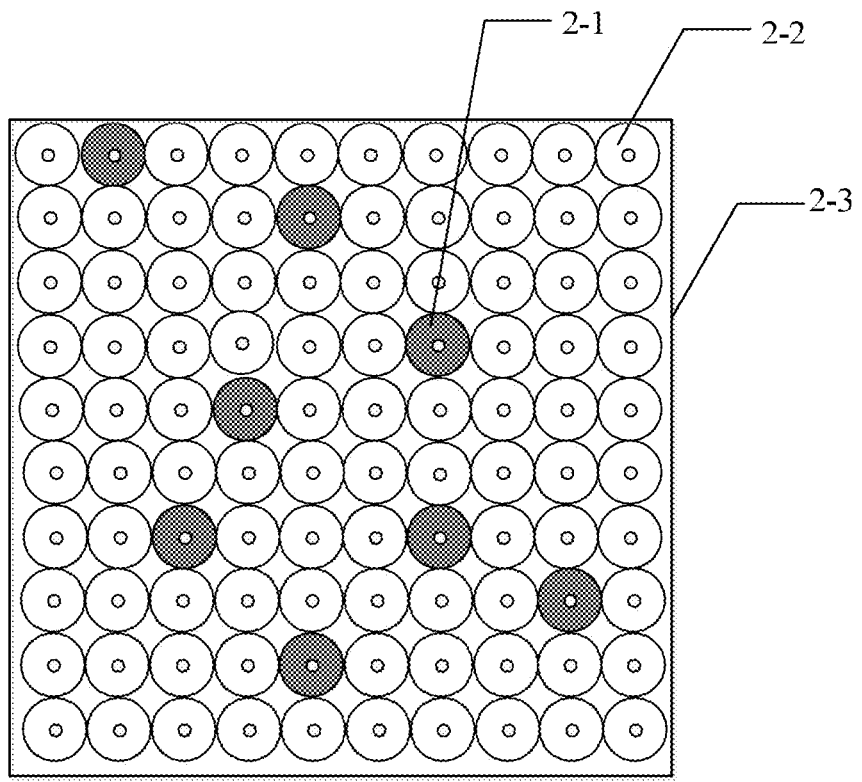
FIG. 2 is a schematic cross-sectional view for the optical fiber array in the all-optical ultrasonic detection device based on light-induced ultrasound and laser interference of the present invention.

FIG. 2 is a schematic cross-sectional view for the optical fiber array in the all-optical ultrasonic detection device based on light-induced ultrasound and laser interference of the present invention. As shown in FIG. 2, the optical fiber array includes first optical fibers 2-1, second optical fibers 2-2, and a ceramic housing 2-3. The first optical fibers 2-1 are optical fibers connected to the first laser via an optical switch, and there are m first optical fibers 2-1. Depending on actual requirements, m optical fibers are selected from the optical fiber array according to specific rules to be connected to the first laser, so that the laser beam of the first laser can be transmitted to generate ultrasound. The second optical fibers 2-2 are optical fibers connected to the second laser, and the remaining n optical fibers in the optical fiber array other than the first optical fibers 2-1 are the second optical fibers 2-2. The second optical fibers 2-2 are connected to the second laser.

Each example of the present specification is described in a progressive manner, each example focuses on the difference from other examples, and the same and similar parts among the examples may refer to each other.

Specific examples are used herein for illustration of the principles and implementations of the present invention. The description of the examples is used to help understand the method and its core principles of the present invention. In addition, those skilled in the art can make various modifications to specific implementations and application scope in accordance with the teachings of the present invention. In conclusion, the content of the present specification shall not be construed as a limitation to the present invention.

The invention claimed is:

1. An all-optical ultrasonic detection device based on light-induced ultrasound and laser interference, comprising:
   a first laser;
   an optical switch;
   a dielectric film;
   a light-absorbing film;
   a second laser;
   a first fiber coupler;
   a plurality of fiber loopbacks;
   an acousto-optic frequency shifter (AOFS);
   a second fiber coupler;
   a third fiber coupler;
   a plurality of fourth fiber couplers;
   a first photodiode;
   a plurality of second photodiodes;
   a plurality of frequency mixers; and
   an acquisition unit,
   wherein an output end of the first laser is connected to the optical switch via an optical fiber;
   a plurality of output ends of the optical switch are separately connected to the dielectric film via a plurality of optical fibers;
   the light-absorbing film is fixed to an emitting light path of the dielectric film; and
   the light-absorbing film is configured to absorb short laser pulses emitted by the first laser to generate light-induced ultrasound;
   the first fiber coupler is located on the emitting light path of the second laser, and the continuous laser beam emitted by the second laser passes through the first fiber coupler and is divided into an initial reference laser beam and a plurality of detection laser beams;
   the AOFS is located on the light path of the initial reference laser beam;
   the initial reference laser beam passes through the AOFS and the second fiber coupler in sequence to generate a plurality of frequency-shifted reference laser beams, and the plurality of frequency-shifted reference laser beams comprise a first frequency-shifted reference laser beam and a plurality of second frequency-shifted reference laser beams;
   the third fiber coupler is located on the emitting light path of the first frequency-shifted reference laser beam;
   the first photodiode is located on the emitting light path of the third fiber coupler;
   and the first photodiode is configured to output a plurality of carrier signals;
   the plurality of second frequency-shifted reference laser beams, the plurality of detection laser beams, the plurality of fiber loopbacks, the plurality of fourth fiber couplers, the plurality of second photodiodes, the plurality of carrier signals and the plurality of frequency mixers are in one-to-one correspondence;
   the plurality of fiber loopbacks are located on the light paths of the plurality of detection laser beams, respectively;
   each detection laser beam passes through the corresponding fiber loopback and reaches the dielectric film that is configured to reflect the detection laser beam; each detection laser beam interferes with the corresponding second frequency-shifted reference laser beam after being reflected to produce interference light;
   the interference light passes through the corresponding fourth fiber coupler and reaches the corresponding second photodiode to produce a frequency-modulated signal;
   the frequency-modulated signal and the corresponding carrier signal are input to the corresponding frequency mixer to produce a mixed signal; and
   the acquisition unit is configured to acquire the mixed signals output by the plurality of frequency mixers separately to obtain a vibration signal for the to-be-detected object.

2. The all-optical ultrasonic detection device based on light-induced ultrasound and laser interference according to claim 1;
   wherein the short laser pulses emitted by the first laser are irradiated to the dielectric film by gating to the optical fiber corresponding to a branch via the optical switch, then pass through the dielectric film, and are irradiated to the light-absorbing film; and
   the light-absorbing film generates light-induced ultrasound to detect the to-be-detected object.

3. The all-optical ultrasonic detection device based on light-induced ultrasound and laser interference according to claim 2;
   wherein the dielectric film is formed by alternately stacking a plurality of dielectric film layers, and has selective transparency for light of different wavelengths; and
   the dielectric film is configured to transmit short laser pulses emitted by the first laser, and reflect the continuous laser beam emitted by the second laser.

4. The all-optical ultrasonic detection device based on light-induced ultrasound and laser interference according to claim 1;
   wherein the ultrasonic pulse has a width of 1 ns to 30 ns.

5. The all-optical ultrasonic detection device based on light-induced ultrasound and laser interference according to claim 4;
   wherein the ultrasonic pulse has a frequency band range of 0.5 MHz to 60 MHz.

6. The all-optical ultrasonic detection device based on light-induced ultrasound and laser interference according to claim 2;
   wherein the continuous laser beam produced by the second laser has a wavelength of 1,310 nm.

7. The all-optical ultrasonic detection device based on light-induced ultrasound and laser interference according to claim 1;
   wherein the first frequency-shifted reference laser beam and the initial reference laser beam are both incident on the third fiber coupler;
   and the light emitted by the third fiber coupler is a laser beam with carrier information.

8. The all-optical ultrasonic detection device based on light-induced ultrasound and laser interference according to claim 1;
   wherein the device further comprises a first amplifier and a plurality of second amplifiers;

an input end of the first amplifier is connected to an output end of the first photodiode;

an output end of the first amplifier is electrically connected to first input ends of the plurality of frequency mixers; and the output end of the first amplifier outputs a plurality of amplified signals that enter a corresponding frequency mixer via a corresponding first input end;

input ends of the plurality of second amplifiers are electrically connected to respective output ends of the second photodiodes; and output ends of the plurality of second amplifiers are electrically connected to respective second input ends of the plurality of frequency mixers; and a plurality of amplified signals output by the first amplifier, the plurality of second amplifiers and the plurality of frequency mixers are in one-to-one correspondence.

9. The all-optical ultrasonic detection device based on light-induced ultrasound and laser interference according to claim 1;

wherein the short laser pulse produced by the first laser has a wavelength of 532 nm.

* * * * *